June 18, 1957
I. W. ALLEN
2,795,997
ILLUMINATED VIEWING DEVICE
Filed March 7, 1955
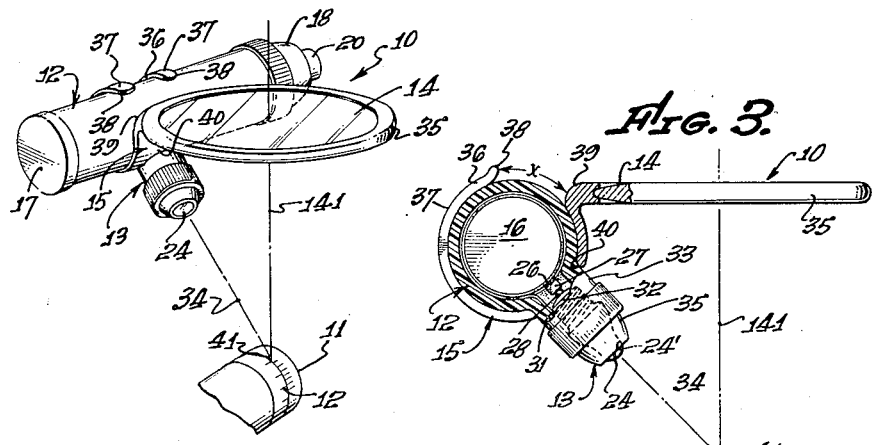
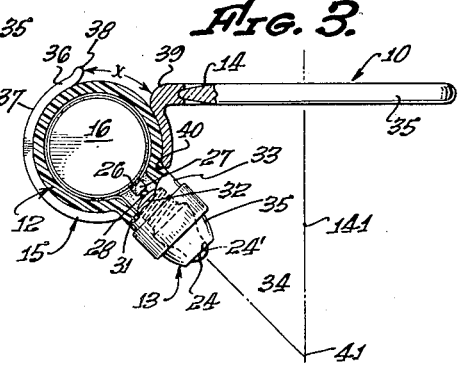
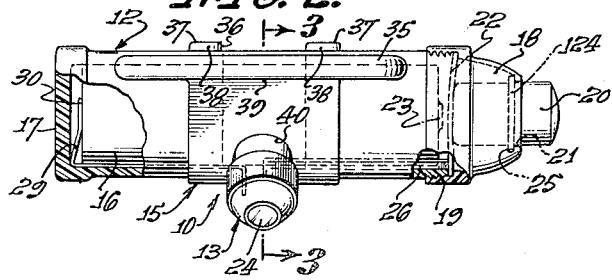
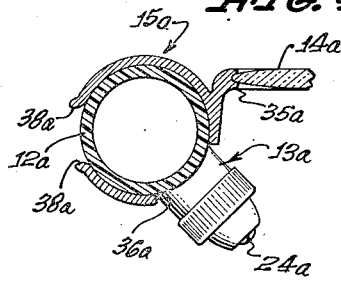
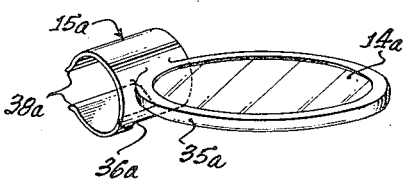
IRVING W. ALLEN,
INVENTOR.
BY William P. Green
ATTORNEY.

United States Patent Office 2,795,997
Patented June 18, 1957

2,795,997
ILLUMINATED VIEWING DEVICE
Irving W. Allen, Los Angeles, Calif.
Application March 7, 1955, Serial No. 492,357
9 Claims. (Cl. 88—39)

This invention relates to improved portable viewing devices of a type adapted to illuminate and facilitate the viewing of an object which may otherwise be difficult to see. Devices embodying the invention are particularly adapted for use in situations where it is desirable to temporarily view rather small and poorly lighted objects or markings, as for assisting a machinist in accurately reading the setting of a machine tool or the like.

The viewer includes a magnifying lens through which a user may view the markings or object in enlarged condition, with a battery energized light bulb being attached to the lens at a location to locally illuminate the area being viewed. Certain particular features of the invention have to do with a unique manner of attaching the lens and lighting parts together, in a manner such that the lens may be easily adjusted relative to the bulb to assure optimum viewing conditions. Preferably, the mounting is such that the lens may be completely detached from the lighting parts if desired.

The battery for energizing the light bulb may be contained within a barrel to which the bulb is attachable. The lens may be attached to the barrel by means of a sleeve receivable about the barrel and movable relative thereto. This sleeve preferably takes the form of a spring clip which is adapted to frictionally grip the surface of the barrel, and thus hold the lens in any desired position relative to the barrel. The sleeve or clip may contain a slot within which the light socket structure on the barrel is receivable to assist in relatively positioning the lens and barrel.

In one form of the invention, the slot extends circularly about the barrel, to normally allow rotary but not axial movement of the clip and lens. The clip may be free for axial movement along the barrel, and detachment therefrom, by rotating the clip to a position in which the socket structure is no longer received in the slot.

In a second form of the invention, the slot or recess opens or faces axially of the barrel, to allow axial movement of the clip and lens while holding these parts against rotary movement form a preferred viewing position.

The above and other features and objects of the present invention will be better understood from the following detailed description of the typical embodiments illustrated in the accompanying drawing in which:

Fig. 1 is a perspective view of a first form of illuminated viewer constructed in accordance with the invention;

Fig. 2 is an enlarged side view, partially in section, of the Fig. 1 viewer;

Fig. 3 is a transverse section taken on line 3—3 of Fig. 2;

Fig. 4 is a transverse sectional view similar to Fig. 3, but showing a variational form of the invention; and Fig. 5 is a perspective view of the lens and mounting clip structure of the Fig. 4 device.

Referring first to Figs. 1 to 3, I have illustrated at 10 a viewing device embodying the invention, and adapted to be used for illuminating and magnifying an object to be viewed, typically represented as a member 11 having rather small markings 112 which are to be read. The viewing device includes a battery containing barrel 12, carrying a laterally projecting light bulb socket structure 13, and also carrying a magnifying lens 14 for enlarging the appearance of markings 112 on the object 11 to be viewed. Lens 14 is attached to the battery barrel or body 12 by a mounting sleeve 15, preferably taking the form of a resilient spring clip.

Barrel 12 is hollow and preferably cylindrical, and of a somewhat elongated configuration for receiving a conventional small size flashlight battery 16. At one end, barrel 12 is closed by an integral transverse end wall 17, and at its opposite end is closed by a removable cap 18. Cap 18 is threadedly connectible to barrel 12 at 19, and carries a finger operated axially movable push button 20. Push button 20 extends through an end opening 21 in cap 18, and carries a resilient contact element 22 which is centrally engageable with end electrode 23 of battery 16 when the push button is pused inwardly. Such engagement of contact 22 with electrode 23 closes the energizing circuit to a light bulb 24 contained within socket structure 13. The contact 22 peripherally engages the end surface of barrel 12 in the assembled condition of the device, and by reason of such engagement serves to resist inward depression of push button 20. Contact 22 is, however, sufficiently resiliently flexible to allow inward movement of the central portion of the contact into engagement with electrode 23. When the operator releases push button 20, the resilience of contact 22 returns the push button axially outwardly, to the position of Fig. 2 in which an annular shoulder 24 on the push button engages an inner shoulder 25 in cap 18.

At one point about its periphery, the electrically conductive contact 22 engages a turned end portion of a conductive strip 26, which extends axially along the inner wall of barrel 12, and whose opposite end is connected to a contact 27 mounted in the end of socket structure 13 for engagement by the inner end contact 28 of light bulb 24. A second electrically conductive strap or lead 29 extends along the inner wall of barrel 12, from a point of contact 30 with the inner end of the battery 16, to a point of connection at 31 with a screw threaded metal electrically conductive socket member 32. The elements 27 and 32 comprise portions of the previously mentioned laterally projecting socket structure 13, which also includes an outer tubular body 33 projecting laterally outwardly from barrel 12 and desirably directed exactly transversely of the longitudinal axis of the barrel. Preferably socket structure body 33 is formed as an integral portion of barrel 12. The screw threaded electrically conductive socket member 32 is stationarily mounted within tubular body 33 of the socket structure, as is the end contact 27.

The light bulb 24 is of course screwed into socket member 32 to a point of engagement with inner contact 27, to thus be energized by the battery when push button 20 is depressed. This light bulb 24 is desirably of the type having a reduced dimension outer end portion 24', which acts as a focusing lens serving to direct substantially all of the light from the bulb as a directed beam 34. A cap 35 may be removably screwed onto the outer end of tubular body 33 of the socket structure 13, to enclose all of the bulb except the light directing end portion 24.

Spring clip 15 may be formed integrally with an annular frame 35 which extends about and mounts viewing lens 14. The part forming this clip and frame, as well as the previously mentioned parts 12, 18 and 35, may be formed of a suitable electrically non-conductive resinous plastic material. Clip 15 extends circularly about barrel 12, and has an open ended slot 36 extending along the major portion of the circular length of the clip. This slot 36 divides the clip 15 into two circularly extending axially spaced fingers 37, which are spaced apart a distance substantially equal to the axial extent of the tubular socket forming projection 33. When the device is assembled, the socket structure 13 is received within slot 36 between fingers 37, to thus prevent movement of clip 15 and the carried lens 14 axially of the battery barrel 12, while at the same time allowing rotary movement of the clip and lens about the barrel axis. The fingers 37 resiliently grip the outer surface of barrel 12, with sufficient force to frictionally retain the clip and lens in any position to which it may be adjusted relative to the barrel. The free ends 38 of clip fingers 37 are spaced from the opposite end 39 of the clip a distance $x$ corresponding to the diameter of the socket structure 13, so that when the clip is rotated about barrel 12 to a position at which the socket structure is received between the opposite clip ends 38 and 39, the clip is then free for axial movement along the barrel. By such axial movement, the clip and carried lens may be moved entirely off of the barrel, the clip being capable of sufficient expansion to slip over the slightly enlarged portion of the barrel at end 17, to thus detach the lens from the barrel and light structure.

Near the lens carrying end 39 of the clip, the slot 36 terminates at a shoulder 40, which serves to limit the rotary movement of the clip and lens at the position illustrated in Fig. 3. In this position, the light beam 34 from bulb 24 is aimed directly at a predetermined optimum viewing location 41 along the axis 141 of magnifying lens 14. In this position, the light serves to illuminate an object which is best positioned for viewing through lens 14.

In using the device shown in Figs. 1 to 3, a person may hold the unit in the position illustrated in Fig. 1 relative to an object to be viewed, following which the push button 20 is pressed inwardly to close the circuit from battery 16 from bulb 24. The beam from bulb 24 is focused by the end of that bulb on the object to be viewed, and the user can then examine the object, magnified and illuminated, through lens 14. The abutment of socket structure 13 with shoulder 40 at the end of slot 36 facilitates setting of the light and lens to the Fig. 3 relative positions in which best viewing will ordinarily be obtained. Under some conditions, it may be desirable to relatively adjust the lens and light, and this adjustment is permitted by the capacity of clip 15 and the the carried lens for rotary movement about the battery barrel 12. The relative positioning of the lens and light is such that, when the light is thus adjusted rotatively relative to the lens, the axis of the light beam moves in a plane which contains the axis of the lens, so that the light beam may be caused to intersect the lens axis at any of various points to thereby illuminate objects at those different points. Also, the lens may be very easily removed from the rest of the device, by rotating the lens and clip about the barrel so that the socket structure is moved out of slot 36, and then moving the clip and lens axially off of the barrel.

Figs. 4 and 5 illustrate a variational form of device, which is the same as that shown in Figs. 1 to 3 except for the manner of formation of the spring clip element 15a. This spring clip 15a, as in the first form of the invention, may be formed integrally with frame 35a which carries lens 14a. The spring clip may be essentially cylindrical, being interrupted at a location 38a which is typically opposite the point of connection to the lens frame. Such interruption of the spring clip 15a at 38a allows for expansion of the clip in order that it may be slipped onto the barrel body 12a. The socket structure 13a is the same in Fig. 4 as in the previous figures. In the assembled condition of the Figs. 4 and 5 device, socket structure 13a is received within an axially opening slot or recess 36a formed in spring clip 15a. Reception of a socket structure within recess 36a retains the lens and clip structure in a rotary position corresponding to that shown in Fig. 3, that is, a position in which the beam from light bulb 24a is aimed directly at a predetermined optimum point along the axis of the viewing lens 14a. To detach the lens structure in the second form of the invention, the clip and lens are merely slipped axially along barrel 12a and off of one of its ends. The resilience of the clip 15a is of course sufficiently great to frictionally hold the clip in any adjusted position on barrel 12a.

I claim:

1. An illuminated viewer comprising a tubular barrel adapted to contain a cylindrical battery, a socket structure carried by said barrel for holding a light bulb adapted to be energized by said battery and to project light on an object, said socket structure projecting laterally from a side of the cylindrical barrel, a manually actuable switch for controlling the energization of said light bulb by said battery, a lens attachable to said barrel for viewing the object illuminated by said bulb, and a mounting sleeve attached to said lens and movably received about said barrel to movably attach the lens to the barrel, said sleeve having a portion containing a slot through which said socket structure projects, and said socket structure being engageable with opposite sides of said slot to restrain movement of the sleeve transversely of the slot.

2. An illuminated viewer as recited in claim 1, in which said slot extends circularly about the barrel, and said opposite sides of the slot extend circularly about the barrel to engage axially against the socket structure and retrain axial movement of the sleeve.

3. An illuminated viewer as recited in claim 2, in which said sleeve has a shoulder at an end of said slot limiting rotary movement of the sleeve and lens at a position in which the light from a bulb held by said socket structure is directed toward a predetermined optimum viewing location along the axis of said lens.

4. An illuminated viewer as recited in claim 3, in which said sleeve is a spring clip having a first end attached to said lens and a second free end which is not directly attached to the lens, said clip resiliently gripping said barrel, and said slot having an open end at said second end of the clip through which said socket structure is relatively movable into and out of the slot.

5. An illuminated viewer as recited in claim 1, in which said opposite sides of the slot extend essentially axially of the barrel to restrain the sleeve against rotary movement relative to the barrel about said axis, said slot being open at one axial end to pass the socket structure relatively into and out of the slot.

6. An illuminated viewer as recited in claim 1, in which said sleeve is a spring clip which is interrupted at one circular location and resiliently grips said barrel.

7. An illuminated viewer comprising a tubular barrel adapted to contain a cylindrical battery, a socket structure carried by said barrel for holding a light bulb adapted to be energized by said battery and to project light on an object, said socket structure projecting laterally from a side of the cylindrical barrel intermediate the ends thereof, a manually actuable switch for controlling the energization of said light bulb by said battery, a lens attachable to said barrel for viewing the object illuminated by said bulb, and a one piece member having a first portion forming a spring clip movably disposed about and resiliently gripping said barrel, said one piece member having a second portion forming a frame projecting outwardly from the barrel and disposed about and holding said lens, said frame and lens lying essentially in a plane disposed parallel to the axis of said barrel, said frame and lens being substantially alined transversely of the barrel, said spring clip containing an open ended slot through which the socket structure projects, and said socket structure being engageable with opposite sides of said slot to restrain movement of the sleeve transversely of the slot.

8. An illuminated viewer as recited in claim 7, in which said spring clip has a first end from which said frame projects and a second free end which is not directly attached to the frame, and said slot extends circularly about the barrel and has an open end at said second end of the clip and through which said socket structure is relatively movable into and out of the slot, said opposite sides of the slot extending circularly about the barrel to engage axially against the socket structure and restrain axial movement of the sleeve, and said clip having a shoulder forming an end of the slot near said frame and limiting rotary movement of the clip and lens at a position in which the light from a bulb held by said socket structure is directed toward a predetermined optimum viewing location along the axis of said lens, said switch including an axially depressible push button at one end of the barrel.

9. An illuminated viewer as recited in claim 7, in which said opposite sides of the slot extend essentially axially of the barrel to restrain the clip against rotary movement relative to the barrel about said axis, said slot being open at one axial end to pass the socket structure relatively into and out of the slot, said switch including an axially depressible push button at one end of the barrel.

References Cited in the file of this patent

UNITED STATES PATENTS

| | | |
|---|---|---|
| 1,556,510 | King | Oct. 6, 1925 |
| 1,925,393 | Lehman | Sept. 5, 1933 |
| 2,326,343 | Eichenberger | Aug. 10, 1943 |
| 2,564,412 | Von Haase | Aug. 14, 1951 |
| 2,629,045 | Frohlich | Feb. 17, 1953 |
| 2,641,965 | Valenza | June 16, 1953 |

FOREIGN PATENTS

| | | |
|---|---|---|
| 378,727 | Germany | July 30, 1923 |